(12) United States Patent
Curic et al.

(10) Patent No.: US 12,557,128 B2
(45) Date of Patent: Feb. 17, 2026

(54) PROCESSING OF UE APPLICATIONS IN A WIRELESS COMMUNICATION SYSTEM

(71) Applicant: International Business Machines Corporation, Armonk, NY (US)

(72) Inventors: Maja Curic, Munich (DE); Sagar Tayal, Ambala (IN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 18/383,087

(22) Filed: Oct. 24, 2023

(65) Prior Publication Data

US 2025/0071787 A1    Feb. 27, 2025

(30) Foreign Application Priority Data

Aug. 22, 2023 (GB) ..................................... 2312783

(51) Int. Cl.
*H04W 4/00* (2018.01)
*H04W 72/04* (2023.01)
*H04W 72/52* (2023.01)

(52) U.S. Cl.
CPC .......... *H04W 72/52* (2023.01); *H04W 72/04* (2013.01)

(58) Field of Classification Search
CPC ..... H04W 72/52; H04W 72/04; H04W 72/51; H04W 72/512; H04W 72/50; H04L 67/306; H04L 67/535
See application file for complete search history.

(56) References Cited

U.S. PATENT DOCUMENTS 12,335,932 B2 *   6/2025   Jia .................... H04W 72/0453
2011/0243014 A1   10/2011  Lee et al.
(Continued)

FOREIGN PATENT DOCUMENTS

CN     110475365 B    4/2023
EP     2882249 A1    6/2015
(Continued)

OTHER PUBLICATIONS

UK Search Report dated Feb. 16, 2024 from GB Application No. GB2312783.0 filed Aug. 22, 2023.
(Continued)

*Primary Examiner* — Thai Dinh Hoang
(74) *Attorney, Agent, or Firm* — Aaron N. Pontikos

(57) ABSTRACT

The present disclosure relates to a method for prescheduling resources for user equipment in a wireless communication system. The method includes identifying a first network-based client-server application and a first user equipment, wherein the first user equipment includes a client side of the application. The method further includes determining a first usage profile for the first user equipment, wherein the first usage profile of the first user equipment indicates an activity pattern of the first user equipment for the first application. The method further includes using the first usage profile for predicting an upcoming activity of the first user equipment with regard to the first application. The method further includes using the upcoming activity for prescheduling resources for the first user equipment to enable the first user equipment to use the first application. The method further includes sending a notification to the first user equipment indicating the prescheduled resources.

19 Claims, 9 Drawing Sheets

(56) References Cited

U.S. PATENT DOCUMENTS

| | | |
|---|---|---|
| 2012/0023226 A1 | 1/2012 | Petersen et al. |
| 2018/0077720 A1 | 3/2018 | Wang et al. |
| 2021/0258866 A1 | 8/2021 | Chou |
| 2023/0027841 A1 | 1/2023 | Chang et al. |
| 2023/0097508 A1 | 3/2023 | Tardieu et al. |

FOREIGN PATENT DOCUMENTS

| | | | |
|---|---|---|---|
| WO | 2013085441 A1 | 6/2013 | |
| WO | 2016055472 A1 | 4/2016 | |
| WO | 2022040897 A1 | 3/2022 | |
| WO | WO-2022048744 A1 * | 3/2022 | ........ H04W 28/0268 |

OTHER PUBLICATIONS

Dryjanski., "O-RAN Near-Real-Time RIC", Rimedo Labs, Apr. 13, 2021, 7 pps., <https://rimedolabs.com/blog/o-ran-hear-real-time-ric/>.
GB Patent Application No. GB2312783.0 filed Aug. 22, 2023.
Zuhra et al., "Towards Optimal Grouping and Resource Allocation for Multicast Streaming in LTE", Jul. 30, 2018, 18 pps., <https://arxiv.org/pdf/1807.11253.pdf>.
International Searching Authority, "Notification of Transmittal of the International Search Report and the Written Opinion of the International Searching Authority, or Declaration," Patent Cooperation Treaty, Nov. 20, 2024, 11 pages, International Application No.—PCT/EP2024/073148.

* cited by examiner

PROCESSING OF UE APPLICATIONS IN A WIRELESS COMMUNICATION SYSTEM

BACKGROUND

The present invention relates to the field of digital computer systems, and more specifically, to a method for prescheduling resources for user equipment.

A mobile application or app may be a computer program designed to run on a mobile device such as a phone, tablet, or watch. Most of the mobile applications may require Internet connections in order to operate. However, a major problem of network-based mobile applications is caused by network transmission delays. For example, applications such as real time gaming or video conferencing applications require extremely low latency.

SUMMARY

Various embodiments provide a method, computer program product, and computer system for prescheduling resources for user equipment as described by the subject matter of the independent claims. Advantageous embodiments are described in the dependent claims. Embodiments of the present invention can be freely combined with each other if they are not mutually exclusive.

In one aspect, the invention relates to a method for prescheduling resources for user equipment in a wireless communication system. The method includes identifying a first network-based client-server application and a first user equipment, wherein the first user equipment includes a client side of the application. The method further includes determining a first usage profile for the first user equipment, wherein the first usage profile of the first user equipment indicates an activity pattern of the first user equipment for the first application. The method further includes using the first usage profile for predicting an upcoming activity of the first user equipment with regard to the first application. The method further includes using the upcoming activity for prescheduling resources for the first user equipment to enable the first user equipment to use the first application. The method further includes sending a notification to the first user equipment indicating the prescheduled resources.

In one aspect the invention relates to a computer program product comprising a computer-readable storage medium having computer-readable program code embodied therewith, the computer-readable program code configured to perform a method. The method includes identifying a first network-based client-server application and a first user equipment, wherein the first user equipment includes a client side of the application. The method further includes determining a first usage profile for the first user equipment, wherein the first usage profile of the first user equipment indicates an activity pattern of the first user equipment for the first application. The method further includes using the first usage profile for predicting an upcoming activity of the first user equipment with regard to the first application. The method further includes using the upcoming activity for prescheduling resources for the first user equipment to enable the first user equipment to use the first application. The method further includes sending a notification to the first user equipment indicating the prescheduled resources.

In one aspect the invention relates to a computer system for prescheduling resources for user equipment in a wireless communication system. The computer system includes one or more computer processors and a computer readable storage medium having computer-readable program code embodied therewith, which when executed by the one or more processors, cause the one or more processors to perform a method. The method includes identifying a first network-based client-server application and a first user equipment, wherein the first user equipment includes a client side of the application. The method further includes determining a first usage profile for the first user equipment, wherein the first usage profile of the first user equipment indicates an activity pattern of the first user equipment for the first application. The method further includes using the first usage profile for predicting an upcoming activity of the first user equipment with regard to the first application. The method further includes using the upcoming activity for prescheduling resources for the first user equipment to enable the first user equipment to use the first application. The method further includes sending a notification to the first user equipment indicating the prescheduled resources.

BRIEF DESCRIPTION OF THE DRAWINGS

In the following, embodiments of the invention are explained in greater detail, by way of example only, making reference to the drawings, in which.

DETAILED DESCRIPTION

Figure 1:
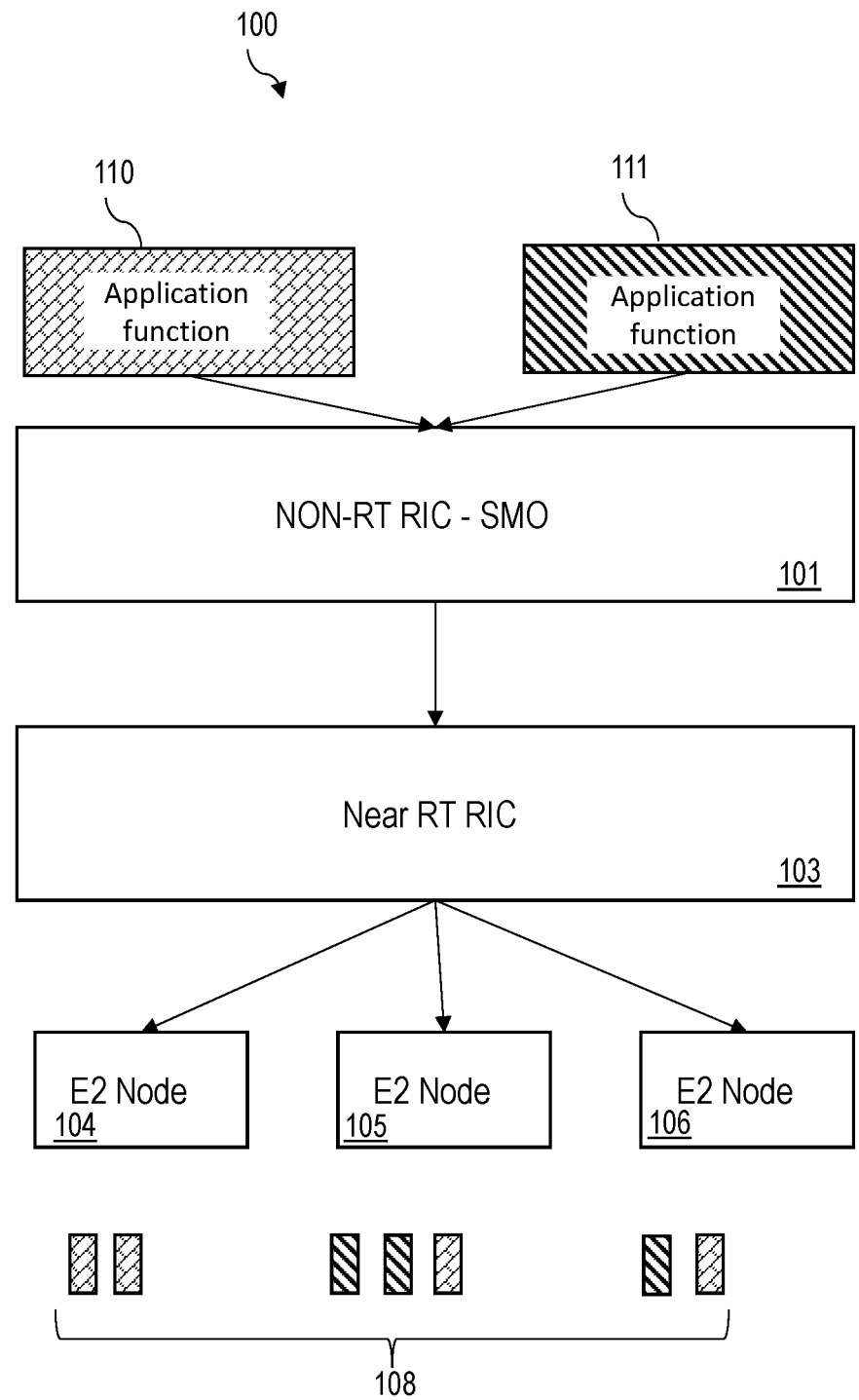
FIG. 1 is a block diagram of a communication system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Scheduling of resources in a wireless communication system may be a process of allocating resources for enabling transmission of data between user equipment and serving nodes. The user equipment may, for example, be a terminal, a subscriber terminal, a smartphone, a mobile station, a mobile phone, a headset, a portable computer, a pad computer, or another type of wireless mobile communication device. The scheduling of resources for user equipment may require a request phase. In the request phase, the user equipment may send a scheduling request to a serving node and receive, in response, the grant of allocated resources. However, this request phase introduces delay before the user equipment can send data. To overcome this issue, the prescheduling of resources may be used without requiring the request phase. The prescheduling is a technique to allocate resources to user equipment in advance of their actual transmission. This may reduce the time it takes for user equipment to send uplink data by reducing the amount of time it spends waiting for a grant from the serving node. However, prescheduling may not be able to provide the necessary level of responsiveness for some applications that require extremely low latency.

The present subject matter may solve this issue by making the prescheduling application dependent by considering the requirements of the applications running on it to determine the most appropriate scheduling approach. The present subject matter may enable dynamic prescheduling because the network node may have access to dynamics of the application which is being used by the user equipment. The network node may thus be able to perceive the arrival of uplink transmission data on the user equipment, prepare reverse channel air interface resources in advance, and configure the prescheduling adaptively.

For that, a network-based client-server application and a first user equipment (e.g., named UE1) that runs on the client side of the application using the wireless communication system may be identified. The network-based client-server application may be an application. The network-based client-server application of UE1 may be referred to as a first application. The network-based client-server application may comprise a client program that consumes services provided by a server program, wherein the client program is installed on the user equipment and the server program is installed on a server which is remote from the user equipment. The network-based client-server application may thus require a network connection to enable the client side to receive and send data to the server side. The network-based client-server application may, for example, be a gaming application, a social media application, or a messaging application. A usage profile of the first application by UE1 may be determined. The usage profile of UE1 indicates the activity pattern of UE1. The activity pattern may, for example, be the radio activity pattern. The activity pattern may indicate the size and time of transmission and/or reception of data by UE1. The usage profile may be used to predict an upcoming activity of UE1 with regard to the first application. The predicted upcoming activity of UE1 may comprise a predicted amount of data by the first application to be transmitted and a time frame in which the activity will occur. For example, the upcoming activity may comprise an expected size of the next uplink (UL) traffic from the first application of UE1 and the expected time of the next UL traffic from UE1. Resources may be prescheduled using the predicted upcoming activity for UE1 to enable UE1 to use the first application. A notification or message may be sent to UE1 indicating to UE1 the prescheduled resources. The prescheduled resources may, for example, indicate the time and frequency resources for establishing next uplink data. For example, the prescheduled resources may indicate physical resource blocks (PRBs).

The present subject matter may thus prevent the following issues. Prescheduling will allocate Physical Uplink Shared Channel (PUSCH) resources for UEs and most of the time these UEs have no data to transmit, so these UEs will send padding in the UL which can increase UL interference. It will lead to higher UL PRB utilization which will generally affect the UL performance. UE battery power consumption will increase as well. Moreover, prescheduling grant cannot be sent for a UE during poor radio coverage.

According to one example, network conditions in the wireless communication system may be determined. The network conditions may be used together with the predicted upcoming activity for performing the prescheduling of the resources. For example, the prescheduling may assign specific PRBs if the network conditions fulfill certain values at the time the specific PRBs are scheduled. For example, if the network conditions are good, such as when a user is able to perform tasks with low latency, and secondly, based on the predicted activity, it may be known that the user will need to access the network after t seconds, then the network condition can determine the ideal time for the user equipment to be scheduled. In the case of a poor network with high latency, the user equipment may be scheduled at T+t1 time, while with good network conditions, it may be scheduled at T+t2 (where t2 is approximately 0ms) and (t1>>t2) to ensure that the pre-scheduled user equipment accesses the network at the most appropriate time. This example may be advantageous for the following reasons. For example, in congested networks, the prescheduling may be able to account for changing network conditions, such as sudden spikes in traffic. This can lead to optimal allocation of resources, resulting in further reduced latency. Prescheduling may be well suited to situations where the amount or type of traffic changes frequently, in which prescheduling adapts to changing traffic patterns.

The network conditions may, for example, comprise the quality of service (QoS) for the user equipment, the resources available in a node that serves the user equipment, and the transport delay between the node that serves the user equipment and the computer system that performs the prescheduling.

According to one example (named grouping example), a second user equipment (named UE2) which comprises a client side of a second application may be identified. A usage profile may be determined for UE2. The usage profile of UE2 may be used for predicting an upcoming activity of UE2 with regard to the second application. At least one comparison may be performed. The at least one comparison comprises a comparison of the predicted activities of UE1 and UE2. If the at least one comparison is successful this may indicate that UE1 and UE2 may form one group, and the notification may be sent as a multicast message to UE1 and UE2. In this case, UE1 and UE2 may be allocated the same prescheduled resources which are indicated in the multicast message or UE1 and UE2 may be allocated at least some shared resources (e.g., they may be scheduled at the same starting point of time but one having more PRBs than the other). In case at least one comparison is not successful, resources may be prescheduled for UE2 to enable UE2 to use the second application and another notification may be sent to UE2 indicating the prescheduled resources. The at least one comparison may be successful if each comparison is successful. The comparison between the activities may be successful if the two activities match each other. The two activities may be matching each other if, for example, each of the two activities indicates the same time for establishing next channel allocation for the respective user equipment.

Alternatively, the two activities may be matching each other if, for example, the time frames for the two activities are at least overlapping, e.g., the time frames may be completely overlapping or may be the same time frames.

In one example, the second application used by UE2 may be the first application used by UE1. Alternatively, the second application used by UE2 may be different from the first application used by UE1.

This example may be advantageous as it may enable to group the user equipment (e.g., the UE1 and UE2 may belong to one group) based on their usage of the application and then making use of this grouping to save processing resources. Indeed, sending a multicast message instead of sending multiple messages may minimize signalling in forward channels. In addition, the prescheduling may be performed commonly for the group of the user equipment. This may enable optimized resource utilization during channel prescheduling in mobile networks by dynamically grouping UEs based on the application requirements, mobility patterns etc.

According to one example, the method further comprises: determining requirements of the application used by the user equipment. The requirements comprise at least the Service Level Agreement (SLA) requirements and resource usage requirements. The requirements may be used together with the predicted activity for performing the prescheduling. For example, the prescheduling may assign specific PRBs that meet the upcoming activity, but also meet the application requirements.

In case the application requirements are used for the prescheduling, the grouping example may be performed as follows. The at least one comparison further comprises the comparison of the application requirements for UE1 and UE2. The comparison of the application requirements is successful if the application requirements are similar or same. The two requirements are similar if a predefined percentage (e.g., 80%) of the two requirements are the same.

According to one example, a trained artificial intelligence (AI) model may be used to predict the upcoming activity. For example, the trained AI model may be configured to receive as input the usage profile of the user equipment and to output a prediction of the upcoming activity of the user equipment. This example may be advantageous because it may enable an accurate prediction of the activities which may in turn enable an improved prescheduling of resources.

The artificial intelligence model may, for example, be performed by using training data. The training data comprises entries. Each entry of the entries comprises a usage profile and a label indicating the activity that bests matches the usage profile. The artificial intelligence model may, for example, be a deep neural network or another AI model that can be trained to predict the activity using the usage profile.

According to one example, the wireless communication system comprises an open radio access network (O-RAN), wherein the O-RAN comprises a Service Management and Orchestration (SMO) node and near-real-time RAN Intelligent Controller (Near RT RIC), wherein the SMO node is configured to perform the identification of the application and the user equipment, the determination of the usage profile and the prediction of the upcoming activity, and to send the information on the precited upcoming activity to the Near RT RIC, wherein the Near RT RIC is configured to use the received information to perform the prescheduling of resources for the user equipment. The notification may, for example, be sent by an E2 node of the O-RAN, wherein the E2 node serves the user equipment. This example may enable a seamless integration of the present subject matter in an existing system. It may for example save processing resources by making use of existing infrastructure such as the SMO node. Indeed, the O-RAN architecture enables direct transmission of external application information to SMO node, which enables dynamic prescheduling effective. For example, the information about expected time and size of the next UE transmission is obtained using the current and historical data collected in the SMO node, Radio Intelligent Controllers, or similar entities. The O-RAN based architecture may enable dynamic adaptive prescheduling parameters configuration to be implemented.

In one example, the prescheduling of resources may be performed in coordination between the Near RT RIC and the E2 node that serves the user equipment. In case multiple user equipment are grouped as described above, one E2 node that serves one of the user equipment may be used to perform the coordination. This may minimize need of Near RT RIC resources to align with each E2 node separately for prescheduling identification.

In one example, the method is performed by an edge system of the wireless communication system. The edge system may, for example, be a base station of the wireless communication system or another component of the radio access network of the wireless communication system.

FIG. 1 is a diagram of a wireless communication system in accordance with an example of the present subject matter. The wireless communication system 100 may, for example, be an O-RAN. The wireless communication system 100 may comprise a Service Management and Orchestration (SMO) node 101 and near-real-time RAN Intelligent Controller (Near RT RIC) 103. The wireless communication system 100 may comprise E2 nodes such as the three E2 nodes 104, 105 and 106. The E2 nodes 104, 105 and 106 serve user equipment 108.

The O-RAN architecture may enable direct transmission of external application information to SMO node 101. The external application information may comprise information on client-server applications such as the application 110 and the application 111. As indicated in FIG. 1, each user equipment installs a client side of one of the two applications. Indeed, the box associated with each application has a respective filling format and the box of each user equipment is filled with the filling format of the application whose client side is installed on the user equipment.

Figure 2:
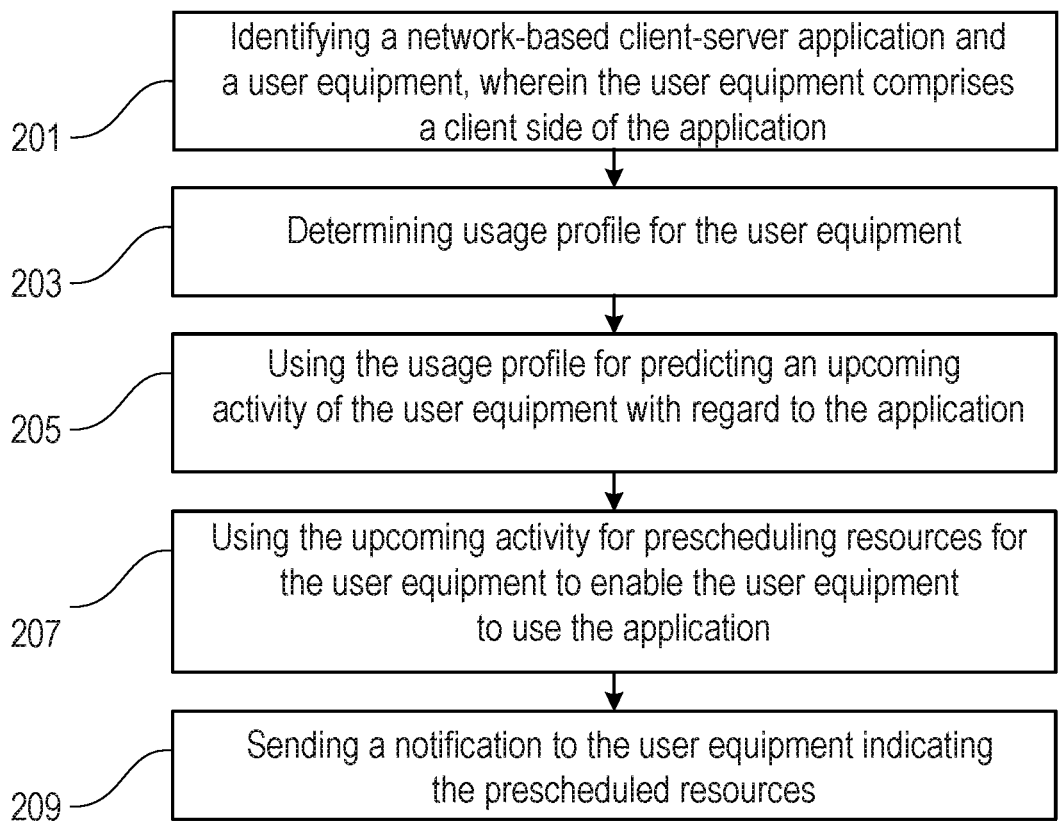
FIG. 2 is a flowchart of a method for prescheduling resources for user equipment in accordance with an example of the present subject matter.

FIG. 2 is a flowchart of a method for prescheduling resources for user equipment in a wireless communication system in accordance with an example of the present subject matter. The wireless communication system may, for example, be the system of FIG. 1.

A network-based client-server application and a user equipment may be identified in step 201. The identification may be performed such that the user equipment comprises a client side of the application. A usage profile for the user equipment may be determined in step 203. The usage profile of the user equipment indicates activity pattern of the user equipment for the application. The usage profile may be used in step 205 for predicting an upcoming activity of the user equipment with regard to the application. The predicted upcoming activity may be used in step 207 for prescheduling resources for the user equipment to enable the user equipment to use the application. A notification may be sent in step 209 to the user equipment indicating the prescheduled resources.

Figure 3:
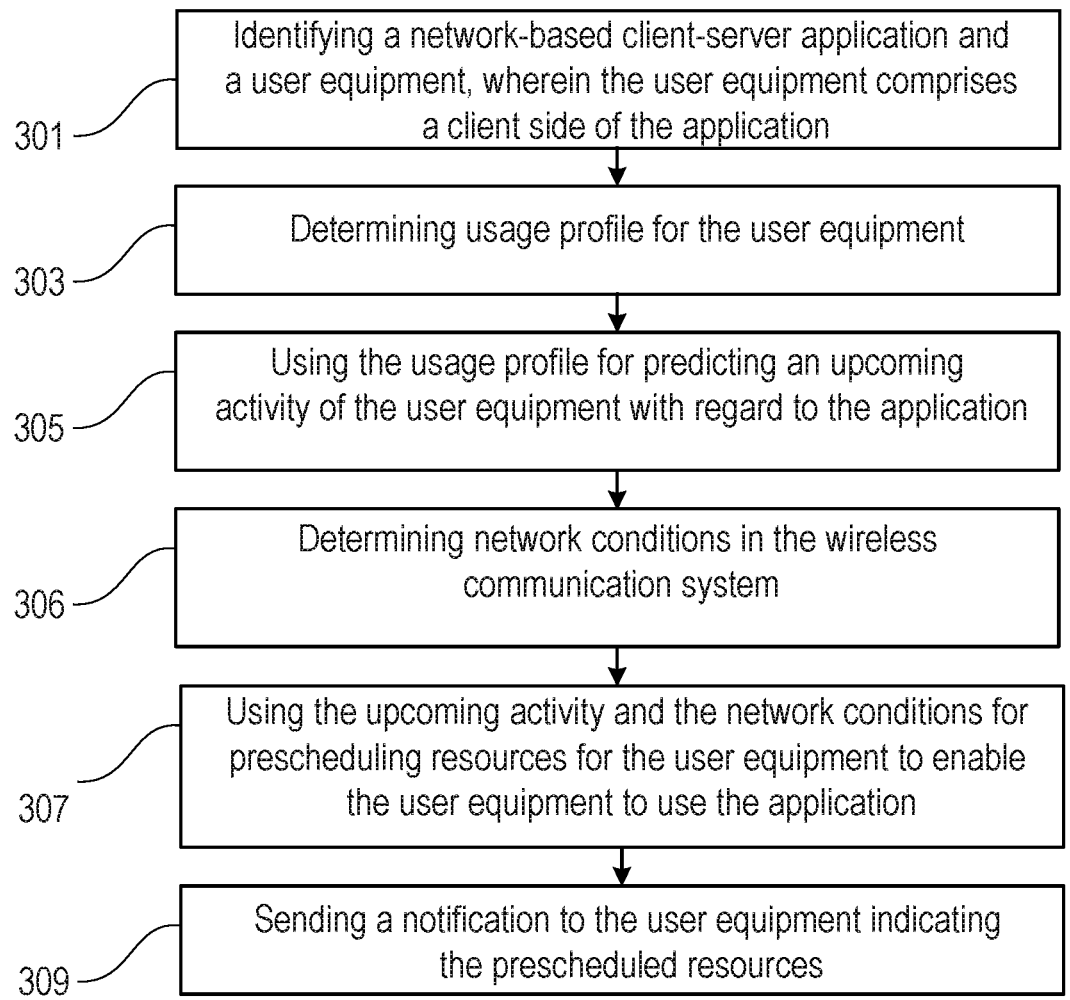
FIG. 3 is a flowchart of a method for prescheduling resources for user equipment in accordance with an example of the present subject matter.

FIG. 3 is a flowchart of a method for prescheduling resources for user equipment in a wireless communication system in accordance with an example of the present subject matter. The wireless communication system may, for example, be the system of FIG. 1.

A network-based client-server application and a user equipment may be identified in step 301. The identification may be performed such that the user equipment comprises a client side of the application. A usage profile for the user equipment may be determined in step 303. The usage profile of the user equipment indicates activity pattern of the user equipment for the application. The usage profile may be used in step 305 for predicting an upcoming activity of the user equipment with regard to the application. The network conditions in the wireless communication system may be determined in step 306. The predicted upcoming activity may be combined with the network conditions in step 307 for prescheduling resources for the user equipment to enable the user equipment to use the application. A notification may be sent in step 309 to the user equipment indicating the prescheduled resources.

Figure 4:
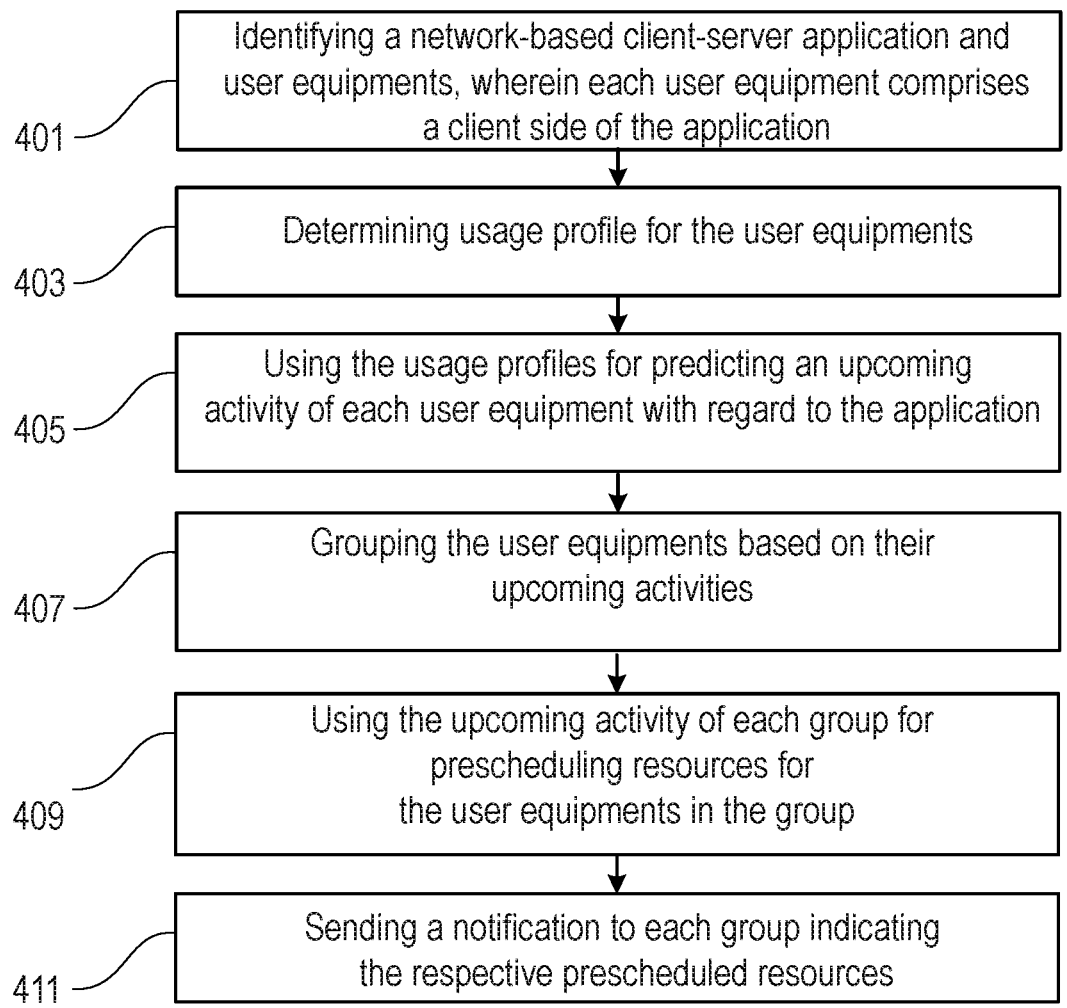
FIG. 4 is a flowchart of a method for prescheduling resources for user equipment in accordance with an example of the present subject matter.

FIG. 4 is a flowchart of a method for prescheduling resources for user equipment in a wireless communication system in accordance with an example of the present subject matter. The method of FIG. 4 may be referred to as grouping method. The wireless communication system may, for example, be the system of FIG. 1.

A network-based client-server application and multiple user equipment may be identified in step 401. The identification may be performed such that each of the user equipment comprises a client side of the application. A usage profile for each user equipment of the multiple user equipment may be determined in step 403. The usage profile of each user equipment indicates activity pattern of the user equipment for the application. The usage profile of each user equipment may be used in step 405 for predicting an upcoming activity of the user equipment with regard to the application. The user equipment may be grouped in step 407 into one or more groups based at least on their upcoming activities. The grouping may further be based on network conditions and application requirements associated with the user equipment. The grouping may be performed by performing at least one comparison. For example, each group may comprise one or more user equipment whose upcoming activities are matching and/or application requirements are matching. For each group of the identified groups, the respective predicted upcoming activities may be used in step 409 for prescheduling resources for the group of user equipment to enable the group of user equipment to use the application. For each group of the identified groups, a notification may be sent in step 411 to the user equipment(s) indicating the prescheduled resources. In case a group has more than one user equipment, the notification is sent as a multicast message.

Figure 5:
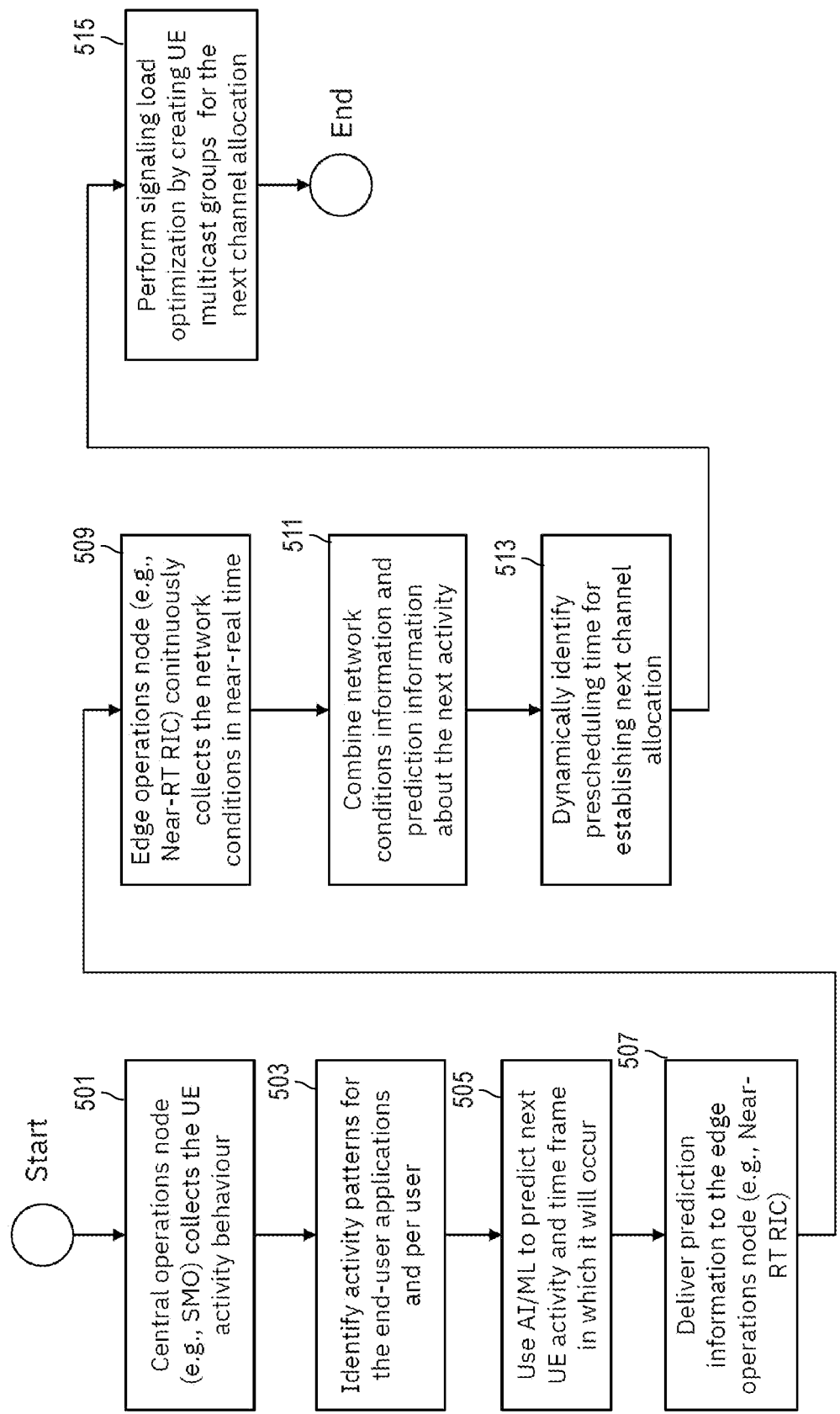
FIG. 5 is a flowchart of a method for prescheduling resources for user equipment in accordance with an example of the present subject matter.

FIG. 5 is a flowchart of a method for prescheduling resources for user equipment in a wireless communication system in accordance with an example of the present subject matter. The wireless communication system may, for example, be the system of FIG. 1.

A central operations node such as the SMO node may collect the UE activity behavior in step 501. The central operations node may use the activity behavior to identify activity patterns for the end user applications and per user equipment in step 503. The central operations node may use an AI/ML model to predict in step 505 next UE activity and time frame in which it will occur. The central operations node may deliver in step 507 prediction information to an edge operations node such as the Near RT RIC. The prediction information indicates the predicted activity. The edge operations node may continuously collect in step 509 the network conditions in near real time. The edge operations node may combine in step 511 the network conditions information and prediction information about the next activity. Using the combination, the edge operations node may dynamically identify in step 513 prescheduling time for establishing next channel allocation. The edge operations node may perform signalling load optimization by creating UE multicast group in step 515 for the next channel allocation. The UE multicast group is the group with several UEs, each with the same identified time for establishing next channel allocation.

Figure 6A:
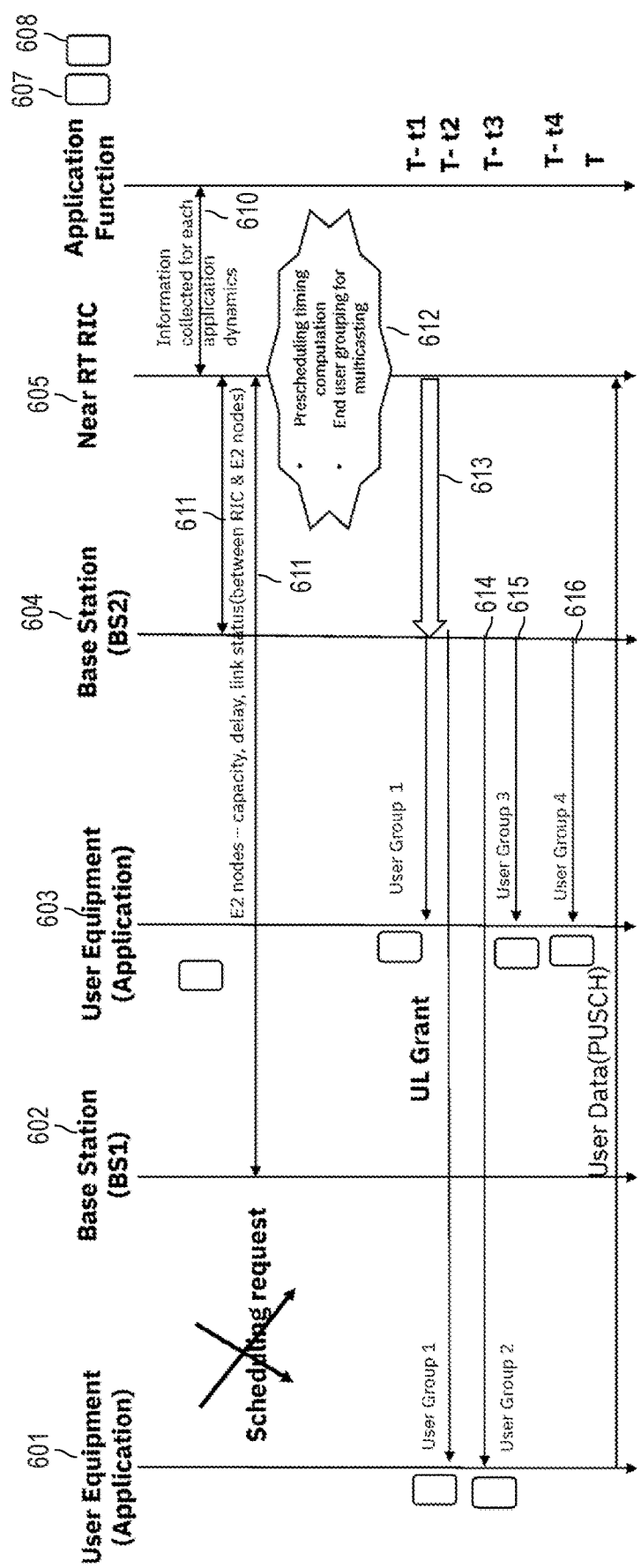
FIG. 6A is a signaling diagram of a method for prescheduling resources for user equipment in accordance with an example of the present subject matter.

FIG. 6A is a signalling diagram of a method for prescheduling resources for user equipment in accordance with an example of the present subject matter.

Figure 6B:
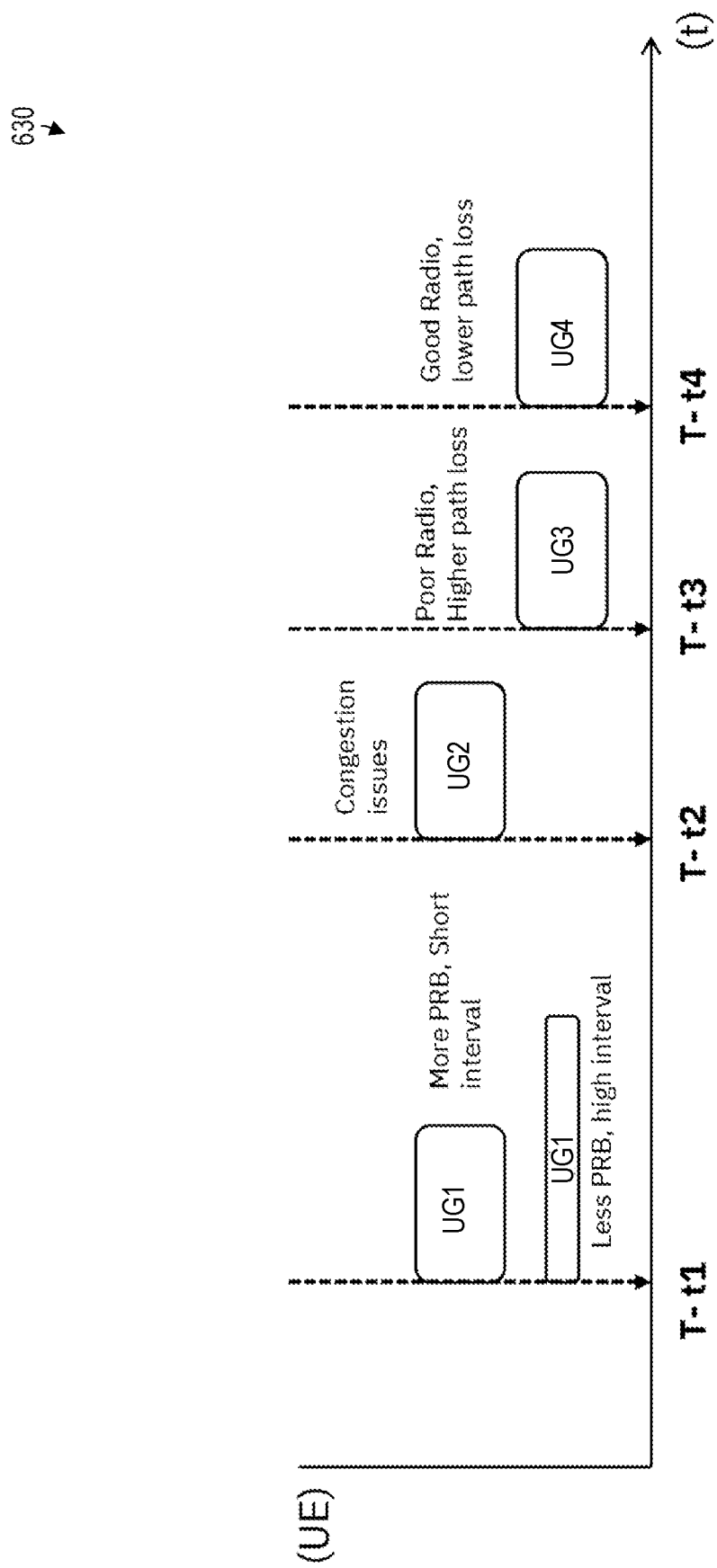
FIG. 6B illustrates prescheduling resources for user equipment based on network conditions in accordance with an example of the present subject matter.

The method of FIG. 6A may be performed in a wireless communication system. The wireless communication system comprises, for example, an open radio access network (O-RAN). The wireless communication system comprises user equipment 601 which are in a serving area of a base station 602. The wireless communication system further comprises user equipment 603 which are in a serving area of a base station 604. The wireless communication system comprises a Near RT RIC 605 and application function. The application function is shown as being provided with two applications 607 and 608. The application function may provide (610) information collected for each application dynamics. Network conditions may be collected (611) at the Near RT RIC 605 e.g., from the base stations 602 and 604. The network conditions may include E2 nodes capacity, delay, and link status between Near RT RIC and E2 nodes. Prescheduling timing computation may be performed and then used (612) for end user grouping for multicasting. As indicated in FIG. 6A, the grouping may result in four groups. The first group (User Group 1 (UG1)) comprises user equipment which use the application 608, while each group of the remaining groups (User Group 2 (UG2), User Group 3 (UG3) and User Group 4 (UG4)) comprises user equipment which use the application 607. The notification of the prescheduled resources may be performed (613, 614, 615, 616) for the groups of UEs using multicasting. Due to the grouping, the notification may be performed by one of the base stations e.g., 604. The time T denotes the time at which the application function expects the reverse transmission (end user to base station). The times t1, t2, t3 and t4 denote the prescheduling of the UL grant so that user packets can arrive in time where t1>t2>t3>t4 (operator ">" refers to "higher than"). Two users are getting UL grant at (T−t1) as both have similar application data requirement with no E2 node constraints, so multicast from E2 nodes is used to avoid signalling and interference. Although using the same application 607, three users are getting scheduled separately at (T−t2), (T−t3) and (T−t4) respectively either due to E2 locations, radio conditions RIC and E2 connection characteristics, or E2 node capacity. FIG. 6B is a diagram 630 illustrating the prescheduled resources for the different groups of users. For example, it shows that for the User Group 1, although the UEs belong to the same group, they may have different prescheduled allocated interval depending on count of allocated physical resource blocks (PRBs). It also indicates that different UEs belonging to the same E2 node and having same application characteristics may still have different groups (e.g., User Group 3 and User Group 4 belong to same base station) due to diverse perceived radio quality. FIG. 6B further shows the network conditions which are used in combination with the predicted activity to preschedule resources for each of the groups.

Figure 6C:
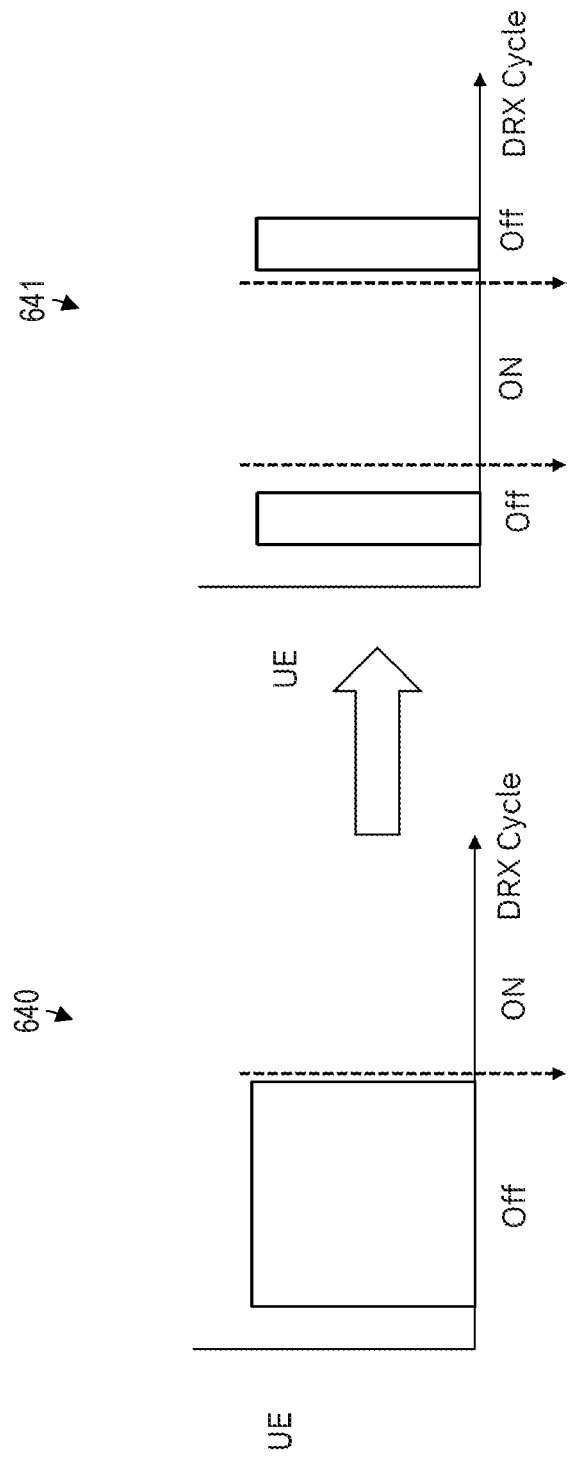
FIG. 6C is a diagram of Discontinuous Reception Cycle (DRX) for user equipment in accordance with an example of the present subject matter.

The present subject matter may further enable shorter cumulative Discontinuous Reception Cycle (DRX) off cycle, which means the user equipment may need to wake up for a shorter time DRX cycle, which is configured dynamically, based on the group to which the UE belongs. This is indicated in FIG. 6C, where the present DRX 641 is compared against an existing DRX 640.

The present subject matter may comprise the following clauses.

Clause 1. A method for prescheduling resources for user equipment in a wireless communication system, the method comprising: identifying a first network-based client-server application and a first user equipment, wherein the first user equipment comprises a client side of the first application; determining a first usage profile for the first user equipment, the first usage profile of the first user equipment indicating an activity pattern of the first user equipment for the first application; using the first usage profile for predicting an upcoming activity of the first user equipment with regard to the first application; using the upcoming activity for prescheduling resources for the first user equipment to enable the first user equipment to use the first application; and sending a notification to the first user equipment indicating the prescheduled resources.

Clause 2. The method of clause 1, further comprising: determining network conditions in the wireless communication system, the network conditions comprising a congestion level at nodes serving the first user equipment and path loss between the nodes and the first user equipment; wherein the prescheduling is performed using the network conditions and the predicted upcoming activity.

Clause 3. The method according to clause 2, further comprising: determining requirements of the first application, the requirements comprising resource usage requirements, wherein the prescheduling is performed using the requirements and the predicted upcoming activity.

Clause 4. The method according to clause 1, further comprising a grouping method, comprising: identifying a second user equipment which comprises a client side of a second identified network-based client-server application; determining a second usage profile for the second user equipment; using the second usage profile of the second user equipment for predicting an upcoming activity of the second user equipment with regard to the second application; performing at least one comparison of the respective predicted activities of the first and second user equipment; and in response to at least one comparison being successful by indicating similarities between the first and second user equipment, performing at least one of sending the notification as a multicast message to the first and second user equipment; or prescheduling resources for the second user equipment to enable the second user equipment to use the second application, and sending another notification to the second user equipment indicating the prescheduled resources.

Clause 5. The method of clause 4, further comprising: determining respective requirements of the first and second applications for the first and second user equipment, wherein the requirements comprise resource usage requirements; and using the requirements and the predicted upcoming activity of the first and second user equipment for performing the respective prescheduling, wherein the at least one comparison comprises a comparison of the application requirements of the first and second user equipment.

Clause 6. The method of clause 4, wherein the second application is the first application.

Clause 7. The method of clause 1, wherein the predicting comprises: inputting the first usage profile to a trained artificial intelligence model for obtaining a prediction of the upcoming activity.

Clause 8. The method of clause 1, wherein the method is automatically performed.

Clause 9. The method of clause 1, wherein the method is performed by an edge system of the wireless communication system.

Clause 10. The method of clause 9, wherein the prescheduled resources comprise time and frequency resources, and a Discontinuous Reception Cycle (DRX) off cycle shorter than a maximum off duration.

Computing environment 800 contains an example of an environment for the execution of at least some of the computer code involved in performing the inventive methods, such code 900 for prescheduling resources for user equipment. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 7:
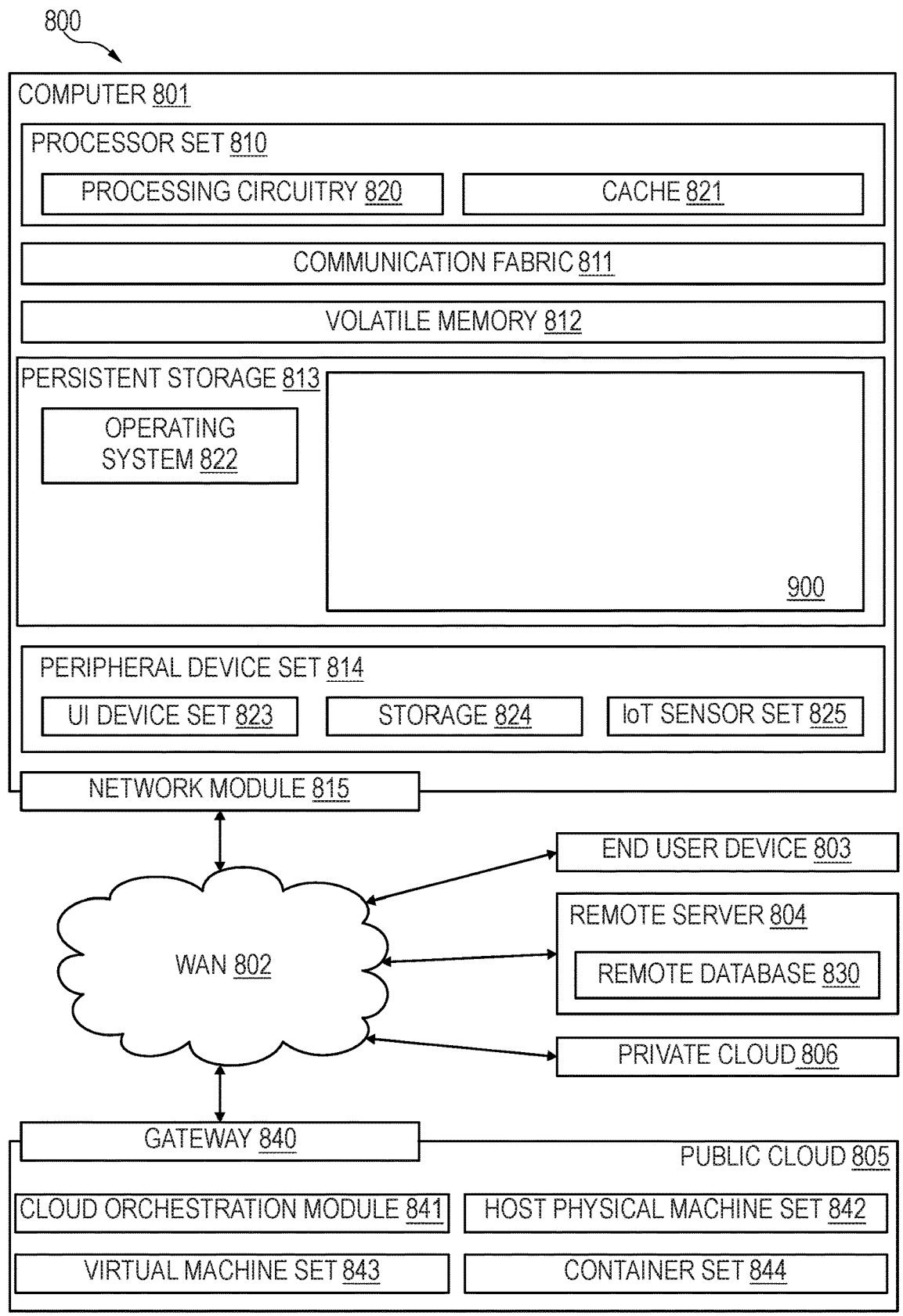
FIG. 7 is a computing environment in accordance with an example of the present subject matter.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 7. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A method for prescheduling resources for user equipment in a wireless communication system, the method comprising:
   identifying a first network-based client-server application and a first user equipment, wherein the first user equipment comprises a client side of the first application;
   determining a first usage profile for the first user equipment, the first usage profile of the first user equipment indicating an activity pattern of the first user equipment for the first application;
   using the first usage profile for predicting an upcoming activity of the first user equipment with regard to the first application;
   using the upcoming activity for prescheduling resources for the first user equipment to enable the first user equipment to use the first application; and
   sending a notification to the first user equipment indicating the prescheduled resources.

2. The method of claim 1, further comprising:
determining network conditions in the wireless communication system, the network conditions comprising a congestion level at nodes serving the first user equipment and path loss between the nodes and the first user equipment; and
wherein the prescheduling is performed using the network conditions and the predicted upcoming activity.

3. The method according claim 1, further comprising:
determining requirements of the first application, wherein the requirements comprise resource usage requirements, and wherein the prescheduling is performed using the requirements and the predicted upcoming activity.

4. The method according claim 1, further comprising:
identifying a second user equipment which comprises a client side of a second identified network-based client-server application;
determining a second usage profile for the second user equipment;
using the second usage profile of the second user equipment for predicting an upcoming activity of the second user equipment with regard to the second application;
performing at least one comparison comprising of the predicted activities of the two user equipment; and
in response to the at least one comparison being successful by indicating similarities between the first and second user equipment, performing at least one of:
sending the notification as a multicast message to the first and second user equipment; or
prescheduling resources for the second user equipment to enable the second user equipment to use the second application and sending another notification to the second user equipment indicating the prescheduled resources.

5. The method of claim 4, further comprising:
determining respective requirements of the first and second applications for the first and second user equipment, wherein the requirements comprise resource usage requirements; and
using the requirements and the predicted upcoming activity of the first and second user equipment for performing the respective prescheduling, wherein the at least one comparison comprises a comparison of the respective application requirements of the first and second user equipment.

6. The method of claim 4, wherein the second application is the first application.

7. The method claim 1, wherein using the first usage profile for predicting an upcoming activity of the first user equipment with regard to the first application comprises:
inputting the usage profile to a trained artificial intelligence model for obtaining a prediction of the upcoming activity.

8. The method of claim 1, wherein the method is performed automatically.

9. The method of claim 1, wherein the method is performed by an edge system of the wireless communication system.

10. The method of claim 1, wherein the prescheduled resources comprise time and frequency resources, and a Discontinuous Reception Cycle (DRX) off cycle shorter than a maximum off duration.

11. A computer program product comprising a computer-readable storage medium having computer-readable program code embodied therewith, the computer-readable program code configured to perform a method, comprising:
identifying a first network-based client-server application and a first user equipment, wherein the first user equipment comprises a client side of the first application;
determining a first usage profile for the first user equipment, the first usage profile of the first user equipment indicating an activity pattern of the first user equipment for the first application;
using the first usage profile for predicting an upcoming activity of the first user equipment with regard to the first application;
using the upcoming activity for prescheduling resources for the first user equipment to enable the first user equipment to use the first application; and
sending a notification to the first user equipment indicating the prescheduled resources.

12. A computer system for prescheduling resources for user equipment in a wireless communication system, the computer system comprising one or more processors, and a computer readable storage medium having computer-readable program code embodied therewith, which when executed by the one or more processors, cause the one or more processors to perform a method, comprising:
identifying a first network-based client-server application and a first user equipment, wherein the first user equipment comprises a client side of the first application;
determining a first usage profile for the first user equipment, the first usage profile of the first user equipment indicating an activity pattern of the first user equipment for the first application;
using the first usage profile for predicting an upcoming activity of the first user equipment with regard to the first application;
using the upcoming activity for prescheduling resources for the first user equipment to enable the first user equipment to use the first application; and
sending a notification to the first user equipment indicating the prescheduled resources.

13. The computer system of claim 12, wherein the method performed by the one or more processors further comprises:
determining network conditions in the wireless communication system, the network conditions comprising a congestion level at nodes serving the first user equipment and path loss between the nodes and the first user equipment, wherein the prescheduling is performed using the network conditions and the predicted upcoming activity.

14. The computer system of claim 12, wherein the method performed by the one or more processors further comprises:
determining requirements of the first application, wherein the requirements comprise resource usage requirements, and wherein the prescheduling is performed using the requirements and the predicted upcoming activity.

15. The computer system of claim 12, wherein the method performed by the one or more processors further comprises:
identifying a second user equipment which comprises a client side of a second identified network-based client-server application;
determining a second usage profile for the second user equipment;
using the second usage profile of the second user equipment for predicting an upcoming activity of the second user equipment with regard to the second application;
performing at least one comparison comprising of the predicted activities of the two user equipment; and in response to the at least one comparison being successful by indicating similarities between the first and second user equipment, performing at least one of:
  sending the notification as a multicast message to the first and second user equipment; or
  prescheduling resources for the second user equipment to enable the second user equipment to use the second application and sending another notification to the second user equipment indicating the prescheduled resources.

16. The computer system of claim 12, wherein the method performed by the one or more processors further comprises:
  determining respective requirements of the first and second applications for the first and second user equipment, wherein the requirements comprise resource usage requirements; and
  using the requirements and the predicted upcoming activity of the first and second user equipment for performing the respective prescheduling, wherein the at least one comparison comprises a comparison of the respective application requirements of the first and second user equipment.

17. The computer system of claim 12, wherein the second application is the first application.

18. The computer system of claim 12, wherein using the first usage profile for predicting an upcoming activity of the first user equipment with regard to the first application comprises:
  inputting the usage profile to a trained artificial intelligence model for obtaining a prediction of the upcoming activity.

19. The computer system of claim 12, wherein the one or more processors that perform the method are part of an edge system of the wireless communication system.

* * * * *